Figure 1:
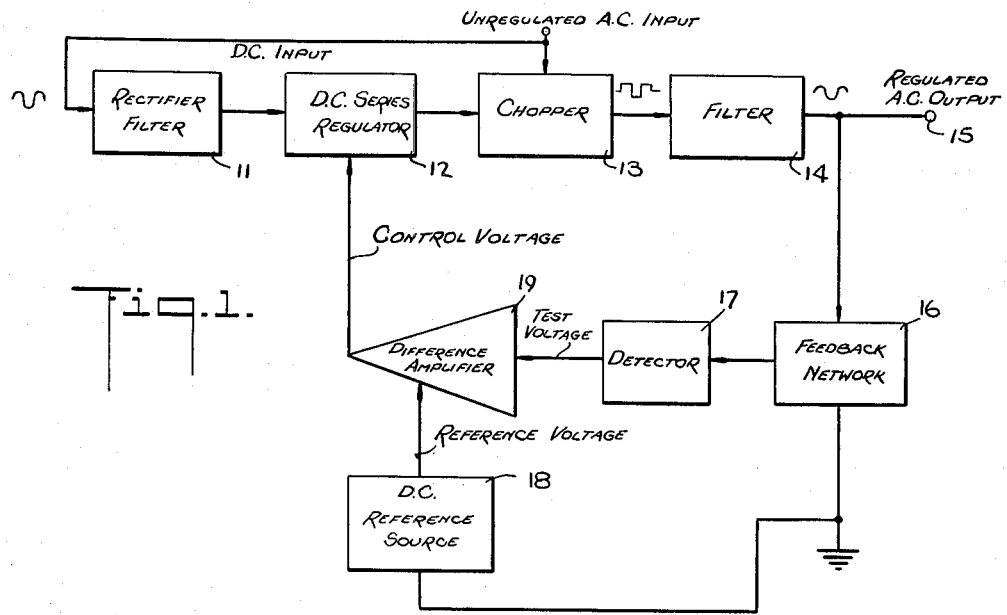

Feb. 22, 1966     O. HELLER ETAL     3,237,082

ALTERNATING CURRENT REGULATOR

Filed Dec. 18, 1961

INVENTORS
OSCAR HELLER
MARVIN FELCHECK
BY
ATTORNEY

United States Patent Office 3,237,082
Patented Feb. 22, 1966

3,237,082
ALTERNATING CURRENT REGULATOR
Oscar Heller, Brooklyn, and Marvin Felcheck, Bayside, N.Y., assignors to Bulova Watch Company, Inc., New York, N.Y., a corporation of New York
Filed Dec. 18, 1961, Ser. No. 159,898
4 Claims. (Cl. 321—18)

This invention relates generally to the regulation of alternating voltage or current supplies and more particularly to an electronic regulator for this purpose incorporating solid state devices.

The regulation of alternating current supplies generally involves a saturable reactor adapted to vary an impedance in series with the supply circuit. While this arrangement produces the desired voltage regulation, the wave form distortion is usually large in comparison to other types of systems and it further requires comparatively large and heavy inductance units.

In D.-C. power supply systems, electronic voltage regulators are ordinarily employed to maintain a substantially constant output across the load despite fluctuations in the load current drawn from the supply or changes in input voltage. Such regulators usually take the form of a variable resistance in series with the output. Since the series resistance, which is the active element, and the load resistance together constitute a voltage divider, the regulator must control the active element in a manner whereby the voltage across the load is held constant.

In practice, the active element takes the form of a transistor or vacuum tube connected serially between the D.-C. voltage source and the load, the load voltage being sampled and compared with a constant reference voltage. The difference therebetween is amplified and applied as a control voltage to the input electrode of the active element to govern the voltage drop therein in a direction and to a degree effecting compensation for any output variation.

There are many situations requiring a highly stable alternating-current sinusoidal voltage supply. For example, in the operation of A.-C. gyromotors, in order to maintain a predetermined motor speed it is mandatory that the applied voltage remain constant and that the wave form thereof be sinusoidal and free of harmonic distortion. Saturable reactor regulators are not suitable for this purpose.

While there are many advantages in the electronic voltage regulator it has not heretofore been possible to use the principles thereof for alternating-current regulation. Accordingly, it is the principal object of this invention to provide electronic regulation of an alternating-current supply using novel techniques which incorporate solid state devices.

More particularly, it is an object of this invention to provide an electronic regulator system for stabilizing an A.-C. supply wherein the unregulated A.-C. voltage is converted to direct voltage which is fed through a series regulator to a chopper and filter arrangement to produce a sinusoidal A.-C. output, the output being sampled and detected to produce a control voltage for governing the regulator.

Also an object of the invention is to provide an electronic regulator system of the above-noted type which is reliable and efficient in operation, and which may be manufactured at low cost.

Briefly stated, these objects are accomplished in a system in which the unregulated A.-C. voltage is rectified and filtered to produce a direct voltage, this voltage being applied through a solid state series regulator to a chopper to produce a square wave whose frequency corresponds to the A.-C. voltage. The square wave is transformed into a sinusoidal output voltage which is sampled and detected to produce a direct test voltage, the test voltage being compared to a reference voltage to develop a control voltage representing the difference therebetween. The control voltage is impressed on the control electrode of the series regulator to vary the resistance thereof in a manner compensating for variations in the output signal.

Figure 2:
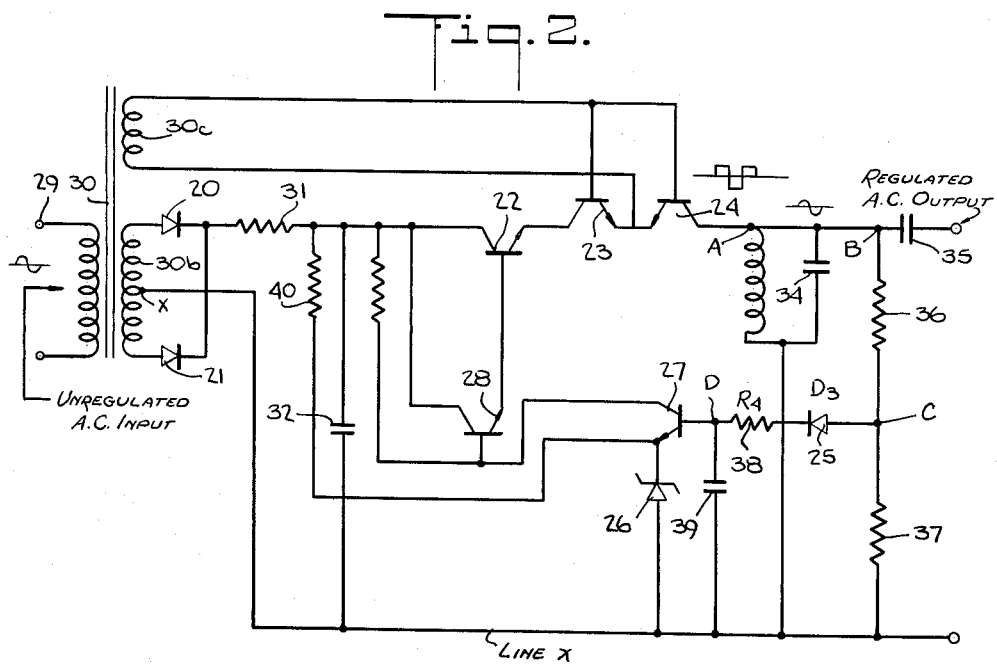

For a better understanding of the invention as well as other objects and further features thereof, reference is made to the following detailed description to be read in conjunction with the accompanying drawings, wherein:

FIG. 1 is a block diagram illustrating the principles underlying the invention, and FIG. 2 is a schematic circuit diagram of a preferred embodiment of an electronic regulator system in accordance with the invention.

Referring now to the drawings, and more particularly to FIG. 1, the major elements of the regulated A.-C. system are an unregulated A.-C. source applied at terminal 10, a rectifier and voltage filter 11, a D.-C. series regulator 12, an electronic chopper 13, a wave shaping filter 14, a feedback network 16, a detector 17, a D.-C. reference source 18 and a difference amplifier 19. The regulated output is produced at terminal 15.

In operation, the unregulated A.-C. input voltage is rectified and filtered by device 11 to produce a direct voltage which is applied through the D.-C. series regulator 12 to the chopper 13. Chopper 13 operates periodically at a rate corresponding to the frequency of the A.-C. input to interrupt the applied direct-voltage, thereby generating a square wave output. The square wave is fed through filter 14 to provide an A.-C. sinusoidal output voltage at terminal 15.

The A.-C. output voltage is now sampled by means of feedback network 16 and an A.-C. voltage proportional to the output voltage is rectified and filtered by detector 17 to provide a direct test voltage. The magnitude of the test voltage varies as a function of variations in the A.-C. output voltage.

The test voltage is compared with a constant direct reference voltage derived from source 18, the comparison being effected by difference amplifier 19 whose output is a control voltage representing the difference between the test and reference voltages. The control voltage is applied to the control electrode of the active regulator element 12 to vary the resistance thereof in a direction and to an extent compensating for any output variation. That is to say, if the output signal increases above a predetermined level, this results in concomitant increase in the control voltage, thereby increasing the resistance of the series regulator. Such increase in resistance increases the voltage drop across the series regulator, thereby lowering the output signal to its predetermined level. But if the output signal falls below this level, the resultant decrease in control voltage acts to lower the resistance of the series regulator to an extent increasing the output signal until it attains the desired level.

Thus the system converts the unregulated A.-C. to D.-C. for purposes of electronic regulation, the D.-C. being inverted to provide an A.-C. output which is sampled and detected to provide a test voltage for comparison with a reference voltage to produce a control voltage for governing the regulator.

Referring now to FIGURE 2, a practical embodiment of an A.-C. regulated system in accordance with the invention comprises a rectifier circuit including diodes 20 and 21, a D.-C. series regulator in which the active variable resistance element is a transistor 22, an electronic solid state chopper formed by a pair of transistors 23 and 24, a detector constituted by diode 25, a reference voltage source including a Zener diode 26, and a differential amplifier formed by transistors 27 and 28. It is to be understood that the system is operable with silicon or germanium transistors, and while NPN types are shown, PNP types may also be used.

The unregulated A.-C. input voltage is applied at terminals 20 to the primary 30a of a power transformer 30, the ends of the secondary winding 30b being connected to diode rectifiers 20 and 21. Diodes 20 and 21 are connected in series opposition to effect full-wave rectification, the junction thereof being connected through a resistor 31 to the collector of transistor 22. A condenser 32 is connected between the collector of transistor 22 and the center tap (point X) of the transformer secondary, resistor 31 in combination with the condenser forming a filter network to smooth the ripples in the D.-C. output of the rectifier circuit. The emitter of regulating transistor 22 is connected to the collector of transistor 23 whose emitter is connected to the emitter of transistor 24.

An alternating-voltage derived from a tertiary winding 30c of the power transformer is applied to the chopper transistors between the bases and the emitters thereof to render these transistors periodically conductive and non-conductive at a rate corresponding to the frequency of the A.-C. input supply. Thus applied to the chopper transistors through the regulating transistor 22 is a direct voltage which is transformed into a square wave which appears at point A.

Connected between point A and a line connected to point X is an inductor 33 in shunt relation with a capacitor 34 forming a low-pass filter which acts to transform the square wave voltage at point A to a sinusoidal voltage at point B. Point B is coupled through capacitor 35 to output terminal 36.

Feedback between the output and the regulator is effected by means of a voltage divider constituted by resistors 36 and 37, connected serially between point B and line X. Point C at the junction of resistors 36 and 37, provides a sample voltage having an amplitude relative to the output of the A.-C. output which depends on the ratio in the values of the two resistors. This sample voltage is detected by means of diode 25 and a filter constituted by resistor 38 and condenser 39 to provide, at point D, a direct test voltage whose magnitude is a function of the amplitude of the alternating output signal and varies therewith.

The test voltage is applied to the base of the first transistor 27 in the differential amplifier. A constant direct reference voltage is applied to the emitter of transistor 27, this voltage being derived from Zener diode 26 connected in series with a resistor 40 between the collector of transistor 22 and line X. Thus the voltage imposed on the Zener diode in the unregulated D.-C. which is also applied to the regulator diode. The action of the Zener diode, in providing a constant voltage output over a wide variation of current through it, results from the breakdown of a silicon junction diode when biased in the back direction. It will be appreciated that other forms of reference voltages may be used, such as battery sources.

The voltage established at the collector of transistor 27 represents the difference between the test voltage and the reference voltage applied to this transistor. This difference voltage is amplified by applying it to the base of transistor 28 whose emitter is connected to the base of regulator transistor 22 and whose collector is connected to the collector thereof.

The amplifier control voltage which is applied to regulator transistor 22 governs the collector-emitter voltage drop thereacross in a direction and to an extent compensating for variations in the A.-C. output. Thus the active series element changes in resistance in accordance with variations in A.-C. output, whereby an increase in voltage output produces an increase in resistance to compensate for the voltage increase, the reverse effect occurring with a decrease in output.

It will be seen that the regulation system is made up entirely of solid state devices and is relatively uncomplicated and reliable, the system acting to stabilize an alternating-current supply. When used with multiple phase supplies, as with three-phase gyromotors, an electronic regulator of the above-described type may be used in conjunction with each phase channel. While there has been shown what is considered to be a preferred embodiment of the invention, it is to be understood that many changes and modifications may be made therein without departing from the essential spirit of the invention as defined in the appended claims.

What is claimed is:

1. A system for regulating an alternating input voltage comprising means to convert the input voltage to a direct-input voltage, an electronic regulator constituted by a transistor having a control element, an electronic chopper including a transistor having a control element, means to apply an alternating voltage derived from said input voltage to the control element of said chopper transistor to render same periodically conductive, means to apply said direct-input voltage through said regulator transistor to said chopper transistor to produce a square wave, means coupled to the output of said chopper transistor to transform said square wave into a sinusoidal output voltage, means to derive from said output voltage a direct test voltage whose magnitude varies as a function of amplitude variations in said output voltage, a direct reference voltage source, means responsive to the difference between said test voltage and said reference voltage to produce a control voltage, and means to apply said control voltage to said control element of the regulator transistor to vary the resistance thereof and thereby regulate said output voltage.

2. A system for regulating an alternating input voltage comprising means to convert the input voltage to a direct-input voltage, an electronic regulator constituted by a transistor having a control element, an electronic chopper including a transistor having a control element, means to apply an alternating voltage derived from said input voltage to the control element of said chopper transistor to render same periodically conductive, means to apply said direct input voltage through said regulator transistor to said chopper transistor to produce a square wave, means coupled to the output of said chopper transistor to transform said square wave into a sinusoidal output voltage, means to derive from said output voltage a sample voltage proportional thereto, means to detect and filter said sample voltage to produce a direct test voltage, a difference amplifier responsive to said test voltage relative to a constant direct reference voltage to produce a control voltage representing the difference therebetween, and means to apply said control voltage to the control element of said regulator transistor to govern the operation thereof and thereby regulate said sinusoidal output voltage.

3. A system for regulating an alternating input voltage comprising means to convert the input voltage to a direct-input voltage, an electronic regulator constituted by a transistor having a control element, an electronic chopper including a transistor having a control element, means to apply an alternating voltage derived from said input voltage to the control element of said chopper transistor to render same periodically conductive, means to apply said direct input voltage through said regulator transistor to said chopper transistor to produce a square wave, filter means coupled to the output of said chopper transistor to transform said square wave into a sinusoidal output voltage, means to derive from said output voltage a sample voltage proportional thereto, means to detect and filter said sample voltage to produce a direct test voltage, means to derive from said direct input voltage a constant reference voltage, means responsive to said reference voltage and said test voltage to produce a control voltage representing the difference therebetween, and means to apply said control voltage to the control element of said regulator transistor to govern the operation thereof and thereby regulate said sinusoidal output voltage.

4. A system for regulating an alternating input voltage comprising a rectifier and filter device to convert the input voltage to a direct-input voltage, an electronic regulator constituted by a transistor having a control element, an electronic chopper including a transistor having a control element, means to apply an alternating voltage derived from said input voltage to the control element of said chopper transistor to render same periodically conductive, means to apply said direct input voltage through said regulator transistor to said chopper transistor to produce a square wave, filter means coupled to the output of said chopper transistor to transform said square wave into a sinusoidal output voltage, voltage divider means to derive from said output voltage a sample voltage proportional thereto, means to detect and filter said sample voltage to produce a direct test voltage, means including a Zener diode to derive from said direct input voltage a constant reference voltage, a difference amplifier responsive to said reference voltage and said test voltage to produce a control voltage representing the difference therebetween, and means to apply said control voltage to the control element of said regulator transistor to govern the operation thereof and thereby regulate said sinusoidal output voltage.

References Cited by the Examiner
UNITED STATES PATENTS

| | | | |
|---|---|---|---|
| 2,785,370 | 3/1957 | Levy | 321—2 |
| 2,959,725 | 10/1960 | Younkin | 321—18 |
| 3,114,097 | 12/1963 | Clarke | 321—18 |

LLOYD McCOLLUM, *Primary Examiner.*